(12) United States Patent  
Kodato et al.

(10) Patent No.: US 8,579,072 B2  
(45) Date of Patent: Nov. 12, 2013

(54) ELECTRIC POWER STEERING SYSTEM AND CONTROLLER OF THE ELECTRIC POWER STEERING SYSTEM

(71) Applicant: Hitachi Automotive Systems Steering, Ltd., Saitama (JP)

(72) Inventors: Masaki Kodato, Sagamihara (JP); Kazuya Yamano, Yamato (JP); Yoshitaka Sugiyama, Machida (JP); Atsushi Yoshitake, Ebina (JP)

(73) Assignee: Hitachi Automotive Systems Steering, Ltd., Saitama (JP)

( * ) Notice: Subject to any disclaimer, the term of this patent is extended or adjusted under 35 U.S.C. 154(b) by 0 days.

(21) Appl. No.: 13/740,330

(22) Filed: Jan. 14, 2013

(65) Prior Publication Data

US 2013/0233639 A1  Sep. 12, 2013

(30) Foreign Application Priority Data

Mar. 9, 2012  (JP) .................. 2012-052526

(51) Int. Cl.  
*B62D 5/04*  (2006.01)

(52) U.S. Cl.  
USPC ......................................... 180/446

(58) Field of Classification Search  
USPC .................................. 180/443, 446  
See application file for complete search history.

(56) References Cited

FOREIGN PATENT DOCUMENTS

| JP | 2002-264832 | 9/2002 |
|---|---|---|
| JP | 2010-36720 | 2/2010 |

*Primary Examiner* — Tashiana Adams  
(74) *Attorney, Agent, or Firm* — Antonelli, Terry, Stout & Kraus, LLP.

(57) ABSTRACT

Electric power steering system has steering mechanism; input and output shaft side rotation angle sensors detecting rotation angles of input and output shafts; operation circuit calculating command current for an electric motor; rotation direction judging circuit judging whether rotation directions of the input and output shafts are identical; advanced-phase judging circuit judging which phase of input and output shaft side rotation angle signals (S1, S2) is advanced; normal/reverse input judging circuit judging that (i) when both rotation directions are identical and S1 is advanced, input is normal input and (ii) when both rotation directions are identical and S2 is advanced, input is reverse input; and command current correcting circuit. The command current correcting circuit corrects the command current so that when the normal input is judged, torque in the same direction as input shaft rotation direction generated by the electric motor is greater than a case of reverse input judgment.

20 Claims, 10 Drawing Sheets

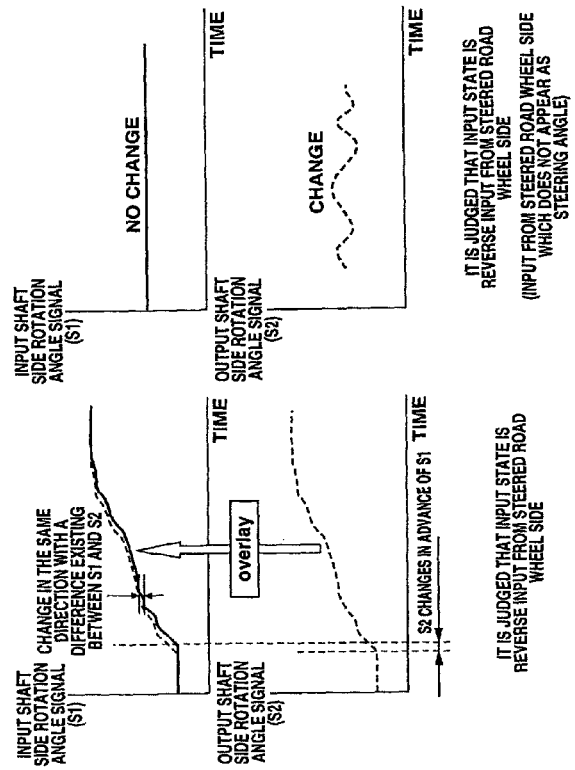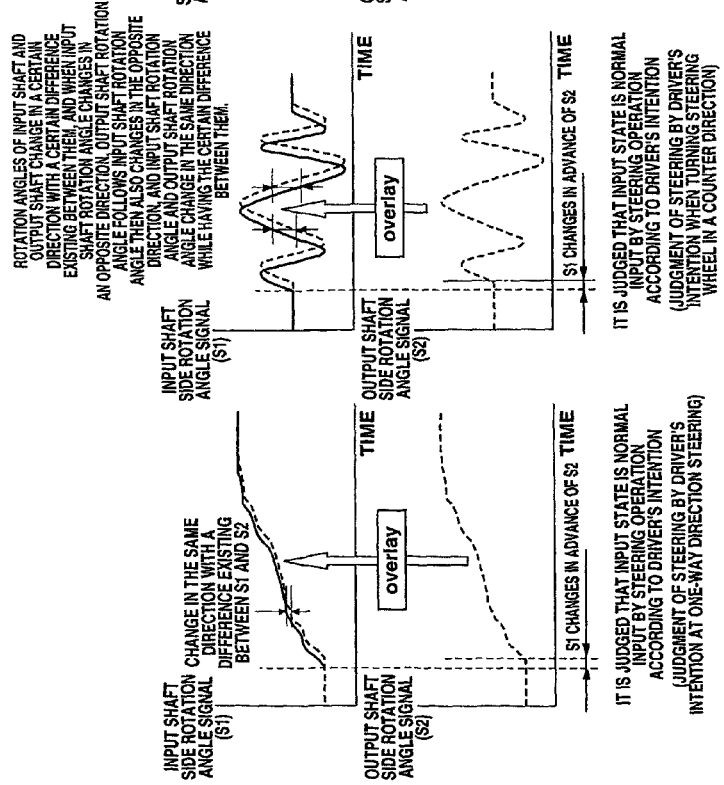

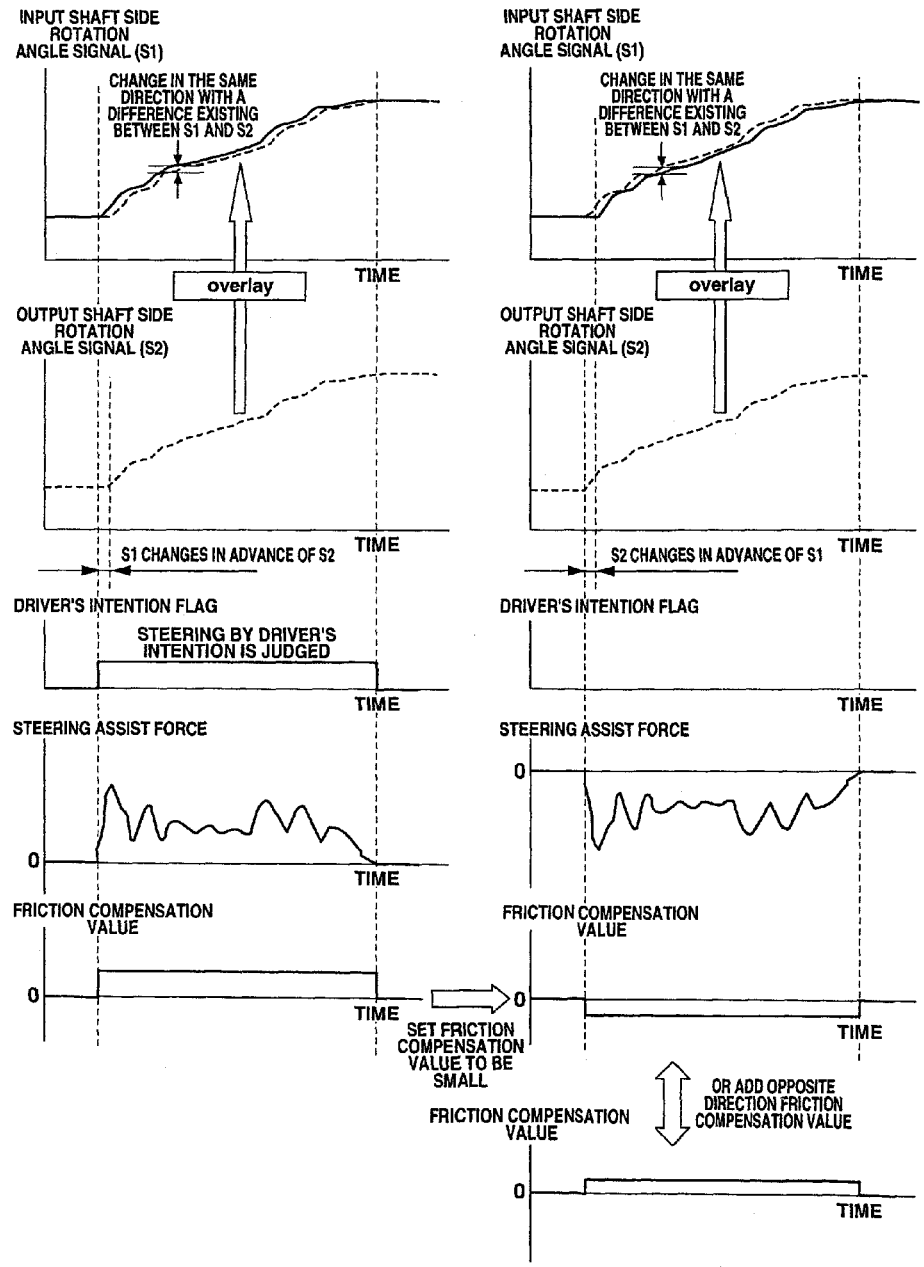

ELECTRIC POWER STEERING SYSTEM AND CONTROLLER OF THE ELECTRIC POWER STEERING SYSTEM

BACKGROUND OF THE INVENTION

The present invention relates to an electric power steering system and a controller of the electric power steering system, which provides a steering assist force to a steering mechanism of a vehicle with an electric motor being a driving source.

In recent years, there have been proposed and developed various electric power steering systems. In the electric power steering systems, a rotation angle of an input shaft which rotates by driver's steering operation of a steering wheel and a rotation angle of an output shaft to which the rotation of the input shaft is transmitted are detected by a detector such as a torque sensor, and on the basis of this detection signal of the torque sensor, torque is transmitted to the steering mechanism of the vehicle from the electric motor. In this manner, the electric power steering system performs the steering assist.

In one such electric power steering system, a judgment is made as to whether a detection (or a detection value) of the torque sensor or a steering angle sensor is a normal input (or a forward input) according to driver's intention or a reverse input from an output shaft side caused by disturbance, by a rate of change of the detection signal of the torque sensor or the steering angle sensor. Then when judging that the detection is the reverse input by disturbance, a disturbance compensation torque is provided to the steering mechanism from the electric motor, thereby stabilizing vehicle behavior and improving steering feel (for instance, Japanese Patent Provisional Publication No. 2010-036720 (hereinafter is referred to as "JP2010-036720")).

SUMMARY OF THE INVENTION

In the electric power steering system of JP2010-036720, however, since the judgment is made only by the rate of change of the detection signal of the torque sensor or the steering angle sensor, an accurate or a correct judgment about whether the detection of the torque sensor or the steering angle sensor is the normal input according to the driver's intention or the reverse input by disturbance is difficult or impossible. As a consequence, it is not possible to provide a proper steering assist force to the steering mechanism from the electric motor.

It is therefore an object of the present invention to provide an electric power steering system and a controller of the electric power steering system, which is capable of correctly judging the normal input and the reverse input and providing the proper steering assist force to the steering mechanism from the electric motor, which allows improvement in the steering feel and steering stability.

According to one aspect of the present invention, an electric power steering system comprises: a steering mechanism having (a) an input shaft which rotates according to a steering operation of a steering wheel; (b) an output shaft which is connected to the input shaft through a torsion bar, and to which the rotation of the input shaft is transmitted; and (c) a conversion mechanism which converts a rotation of the output shaft to a steering motion of steered road wheels; an input shaft side rotation angle sensor provided at an input shaft side and detecting a rotation angle of the input shaft; an output shaft side rotation angle sensor provided at an output shaft side and detecting or estimating a rotation angle of the output shaft; an electric motor providing a steering assist force to the steering mechanism; an operation circuit calculating, on the basis of a vehicle driving condition, a command current value that is sent to the electric motor; a rotation direction judging circuit provided in the operation circuit and judging whether or not a rotation direction of the input shaft and a rotation direction of the output shaft are identical; an advanced-phase judging circuit provided in the operation circuit and judging which phase of an input shaft side rotation angle signal that is an output signal of the input shaft side rotation angle sensor and an output shaft side rotation angle signal that is an output signal of the output shaft side rotation angle sensor is advanced; a normal/reverse input judging circuit provided in the operation circuit and judging that (i) when the rotation direction judging circuit judges that both rotation directions are identical and also the advanced-phase judging circuit judges that the phase of the input shaft side rotation angle signal is advanced, an input state is a normal input by which torsion of the torsion bar occurs by an input from the input shaft side, and (ii) when the rotation direction judging circuit judges that both rotation directions are identical and also the advanced-phase judging circuit judges that the phase of the output shaft side rotation angle signal is advanced, the input state is a reverse input by which the torsion of the torsion bar occurs by an input from the output shaft side; and a command current correcting circuit provided in the operation circuit and correcting the command current value for the electric motor so that when the normal input is judged by the normal/reverse input judging circuit, a generation torque in the same direction as the rotation direction of the input shaft by the electric motor is greater than that of a case where the reverse input is judged by the normal/reverse input judging circuit.

According to another aspect of the present invention, a controller of an electric power steering system that provides a steering assist force to steered road wheels by an electric motor according to a steering operation of a steering wheel, the controller comprises: an operation circuit calculating, on the basis of a vehicle driving condition, a command current value that is sent to the electric motor; a rotation angle receiving section provided in the operation circuit and receiving an input shaft side rotation angle signal that is a signal regarding a rotation angle of an input shaft which rotates according to the steering operation of the steering wheel and an output shaft side rotation angle signal that is a signal regarding a rotation angle of an output shaft which is connected to the input shaft through a torsion bar and to which the rotation of the input shaft is transmitted; a rotation direction judging circuit provided in the operation circuit and judging whether or not a rotation direction of the input shaft and a rotation direction of the output shaft are identical on the basis of the input shaft side rotation angle signal and the output shaft side rotation angle signal; an advanced-phase judging circuit provided in the operation circuit and judging which phase of the input shaft side rotation angle signal and the output shaft side rotation angle signal is advanced; a normal/reverse input judging circuit provided in the operation circuit and judging that (i) when the rotation direction judging circuit judges that both rotation directions are identical and also the advanced-phase judging circuit judges that the phase of the input shaft side rotation angle signal is advanced, an input state is a normal input by which torsion of the torsion bar occurs by an input from the input shaft side, and (ii) when the rotation direction judging circuit judges that both rotation directions are identical and also the advanced-phase judging circuit judges that the phase of the output shaft side rotation angle signal is advanced, the input state is a reverse input by which the torsion of the torsion bar occurs by an input from the output shaft side; and a command current correcting circuit provided in the operation circuit and correcting the command current value for the electric motor so that when the normal input is judged by the normal/reverse input judging circuit, a generation torque in the same direction as the rotation direction of the input shaft by the electric motor is greater than that of a case where the reverse input is judged by the normal/reverse input judging circuit.

The other objects and features of this invention will become understood from the following description with reference to the accompanying drawings.

BRIEF DESCRIPTION OF THE DRAWINGS

FIGS. 5A to 5D are time charts showing a normal/reverse input judgment criteria by a normal/reverse input judging circuit.

FIGS. 6A and 6B are time charts showing a friction compensation value, of the embodiment 1.

DETAILED DESCRIPTION OF THE INVENTION

Embodiments of an electric power steering system of the present invention will be explained below with reference to the drawings.

Embodiment 1

Figure 1:
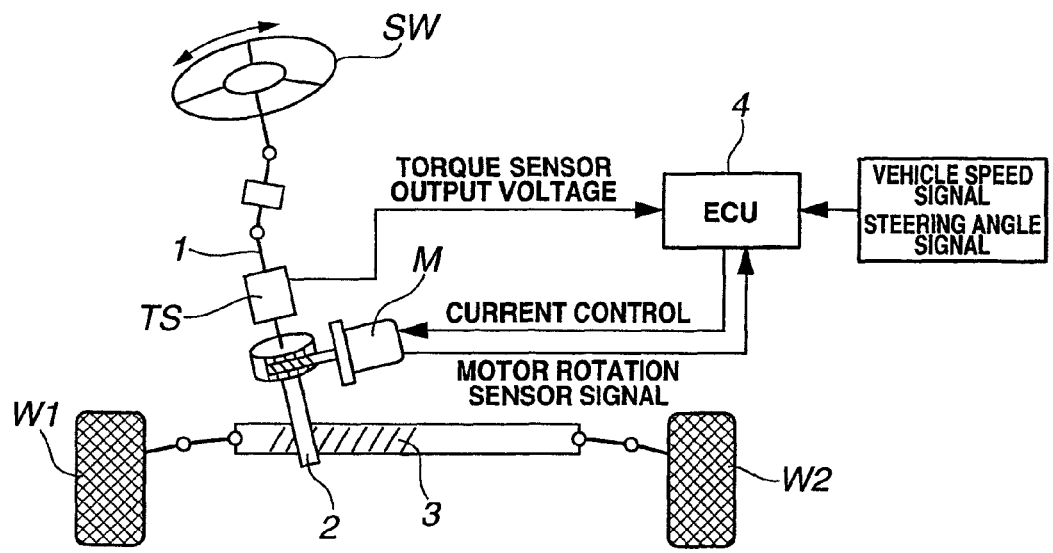
FIG. 1 is a schematic view of an electric power steering system of an embodiment 1 of the present invention.

FIG. 1 is a schematic view of an electric power steering system of an embodiment 1 of the present invention. In the electric power steering system shown in FIG. 1, a basic steering mechanism is formed by a steering wheel SW, a steering shaft 1, a pinion shaft 2 and a rack shaft 3. This steering mechanism is configured so that when the steering wheel SW is turned by driver's steering operation, the rotation of the steering wheel SW is transmitted to the pinion shaft 2 through the steering shaft 1, and a rotary motion of the pinion shaft 2 is converted to a rectilinear motion of the rack shaft 3, then right and left steered road wheels W1 and W2 that are connected to both shaft ends of the rack shaft 3 are steered. That is, the rack shaft 3 is provided, on a surface thereof, with rack teeth (not shown) with which the pinion shaft 2 engages, and by the engagement between the rack teeth and the pinion shaft 2, a conversion mechanism that converts the turning of the steering shaft 1 to a steering motion is achieved.

The steering shaft 1 is provided with a torque sensor TS that detects a rotation angle of the steering shaft 1. A controller or control unit (hereinafter called ECU) 4 performs a current control of an electric motor M on the basis of an output voltage and a motor rotation sensor signal of the torque sensor TS, then a steering assist force is provided to the pinion shaft 2 from the electric motor M.

Figure 2:
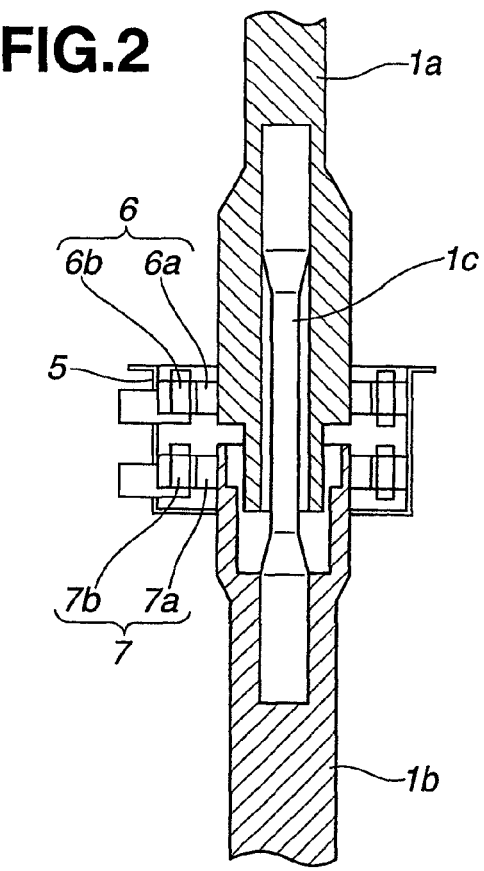
FIG. 2 is a sectional view showing a structure of a steering shaft, of the embodiment 1.

As shown in FIG. 2, the steering shaft 1 is divided into an input shaft 1a at a steering wheel SW side in an axial direction and an output shaft 1b at a rack shaft 3 side in the axial direction. Each of the input shaft 1a and the output shaft 1b is formed into a hollow shape, and these input and output shafts 1a, 1b are coaxially connected to each other through a torsion bar 1c that is provided at inner peripheral sides of the input shaft 1a and the output shaft 1b. Here, the input shaft 1a and the torsion bar 1c, also the output shaft 1b and the torsion bar 1c are each connected through a neutral pin or by press-fitting. With this connection, the input shaft 1a and the output shaft 1b can rotate with respect to each other by torsion deformation of the torsion bar 1c.

In order to stand external environment, a casing 5 fixed to a vehicle body and surrounding an outer peripheral side of the steering shaft 1 is provided at the outer peripheral side of the steering shaft 1. An input shaft side rotation angle sensor (e.g. a resolver) 6 to detect a rotation displacement of the input shaft 1a is set between an inner peripheral surface of the casing 5 and an outer peripheral surface of the input shaft 1a. Further, an output shaft side rotation angle sensor (e.g. a resolver) 7 to detect (or estimate) a rotation displacement of the output shaft 1b is set between the inner peripheral surface of the casing 5 and an outer peripheral surface of the output shaft 1b. That is, a relative rotation displacement amount between the input shaft 1a and the output shaft 1b based on the torsion deformation of the torsion bar 1c is detected by both the rotation angle sensors 6 and 7, then a steering torque generated by the driver's steering wheel turning operation is detected. In other words, the torque sensor TS for detecting the torque that acts on the steering shaft 1 is formed by both of the input shaft side rotation angle sensor 6 and the output shaft side rotation angle sensor 7.

Both the rotation angle sensors 6 and 7 are a well-known variable reluctance (VR) type sensor in which only a stator is provided with a coil, but a rotor is not provided with the coil. The input shaft side rotation angle sensor 6 has a ring-shaped input shaft side rotor 6a and a ring-shaped input shaft side stator 6b. The ring-shaped input shaft side rotor 6a is integrally fitted onto the outer peripheral surface of the input shaft 1a. The ring-shaped input shaft side stator 6b is fixed to the casing 5 with a certain radial direction gap provided between an outer peripheral surface of the input shaft side rotor 6a and the input shaft side stator 6b. On the other hand, the output shaft side rotation angle sensor 7 has a ring-shaped output shaft side rotor 7a and a ring-shaped output shaft side stator 7b. The ring-shaped output shaft side rotor 7a is integrally fitted onto the outer peripheral surface of the output shaft 1b. The ring-shaped output shaft side stator 7b is fixed to the casing 5 with a certain radial direction gap provided between an outer peripheral surface of the output shaft side rotor 7a and the output shaft side stator 7b.

The output voltages from the input shaft side rotation angle sensor 6 and the output shaft side rotation angle sensor 7 are inputted into the ECU 4 through a harness (a clock cable, a slip ring etc.) or radio communication. The ECU 4 calculates a torsion angle of the torsion bar 1c from a difference between the output values of the input shaft side rotation angle sensor 6 and the output shaft side rotation angle sensor 7. Further, the ECU 4 calculates or detects, from the torsion bar torsion angle, a steering torque generated at the torsion bar 1c, using a following expression.

(torsion bar torque)=(torsion bar torsion angle)×(torsion bar rigidity)

In addition, the ECU 4 inputs the motor rotation sensor signal, a vehicle speed signal and a steering angle signal, and performs the current control of the electric motor M. By checking the torsion bar torsion angle by the torque sensor TS and a rotation angle of the electric motor M, it is possible to judge whether the detection is a normal input (or a forward input) according to driver's intention or a reverse input from the steered road wheel W1, W2 sides.

Figure 3:
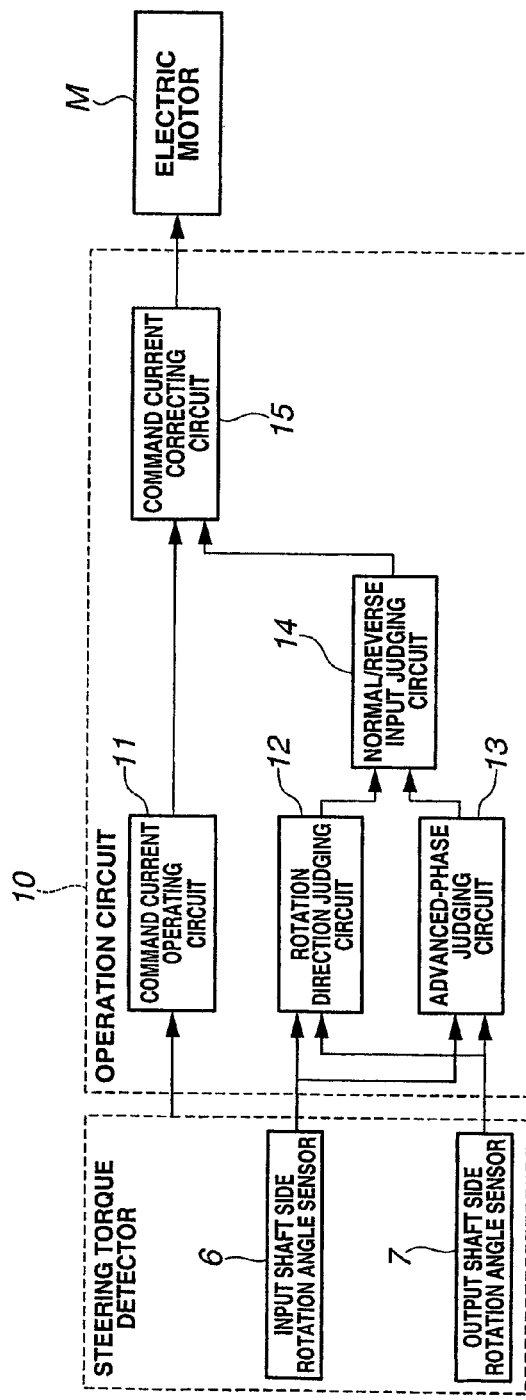
FIG. 3 is a block diagram showing a configuration of an operation circuit, of the embodiment 1.

Next, a configuration of an operation circuit 10 provided in the ECU 4, of the embodiment 1, will be explained with reference to FIG. 3. As shown in FIG. 3, the operation circuit 10 has a command current operating circuit 11, a rotation direction judging circuit 12, an advanced-phase judging circuit 13, a normal/reverse input judging circuit 14 and a command current correcting circuit 15.

The command current operating circuit 11 inputs the output of the torque sensor TS, the motor rotation sensor signal, the vehicle speed signal and the steering angle signal (in FIG. 3, each arrow of these signals is not shown), and calculates a command current for the electric motor M, then outputs it to the command current correcting circuit 15. This command current is a value to generate a basic steering assist force provided to the pinion shaft 2 from the electric motor M.

The rotation direction judging circuit 12 judges whether a rotation direction of the input shaft 1a and a rotation direction of the output shaft 1b are identical or not (namely that the rotation direction judging circuit 12 judges whether or not the input shaft 1a and the output shaft 1b rotate in the same direction), on the basis of an input shaft side rotation angle signal S1 that is the output signal of the input shaft side rotation angle sensor 6 and an output shaft side rotation angle signal S2 that is the output signal of the output shaft side rotation angle sensor 7, both of which are inputted through a rotation angle receiving section (not shown).

In the present embodiment 1, this judgment as to whether the both rotation directions are identical or not is made at a predetermined cycle period. When the input shaft side rotation angle signal S1 continuously changes in a same direction and also the output shaft side rotation angle signal S2 continuously changes in the same rotation direction as the input shaft side rotation angle signal S1 within the predetermined cycle period, it is judged that the input shaft 1a and the output shaft 1b rotate in the same direction.

The advanced-phase judging circuit 13 judges which phase of the input shaft side rotation angle signal S1 and the output shaft side rotation angle signal S2 inputted through the rotation angle receiving section (not shown) is advanced.

The normal/reverse input judging circuit 14 judges whether an input state is the normal input by which the torsion of the torsion bar is occurs by the input from the input shaft 1a side (hereinafter, simply called normal input) or the reverse input by which the torsion of the torsion bar 1c occurs by the input from the output shaft 1b side (hereinafter, simply called reverse input), on the basis of the judgment of the rotation direction judging circuit 12 and the advanced-phase judging circuit 13.

The command current correcting circuit 15 corrects the command current that is calculated in the command current operating circuit 11, on the basis of the judgment of the normal/reverse input by the normal/reverse input judging circuit 14.

Figure 4:
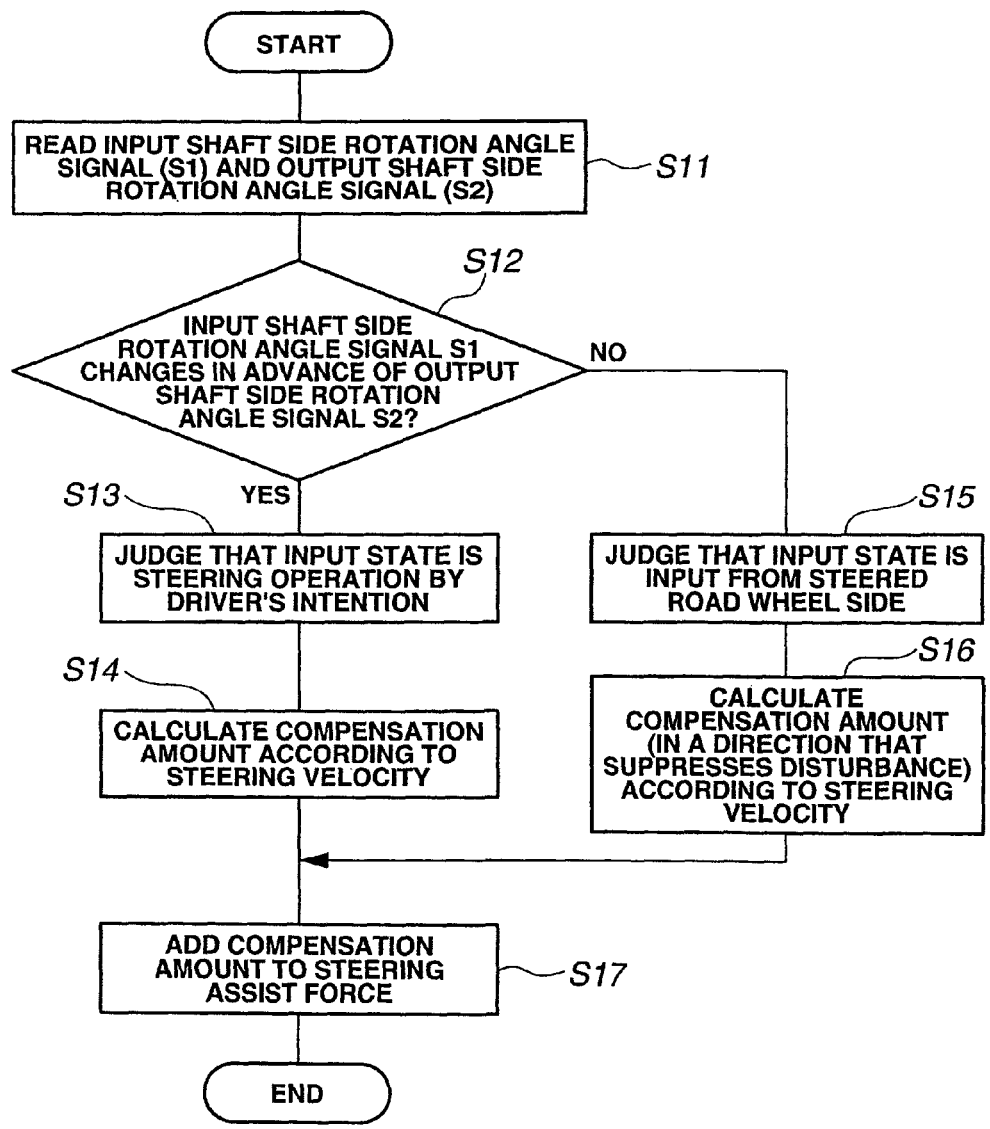
FIG. 4 is a flow chart showing each operation step of the operation circuit, of the embodiment 1.

Next, each operation step (steps S11 to S17) of the operation circuit 10, of the embodiment 1, will be explained with reference to a flow chart in FIG. 4.

At step S11, the input shaft side rotation angle signal S1 and the output shaft side rotation angle signal S2 are read through the rotation angle receiving section.

At step S12, the advanced-phase judging circuit 13 judges whether or not the change (or shift) of the input shaft side rotation angle signal S1 is advanced with respect to that of the output shaft side rotation angle signal S2. If YES (namely that when judging that the input shaft side rotation angle signal S1 changes in advance of the output shaft side rotation angle signal S2), the routine proceeds to step S13. If NO (namely that when judging that the output shaft side rotation angle signal S2 changes in advance of the input shaft side rotation angle signal S1), the routine proceeds to step S15.

At step S13, the normal/reverse input judging circuit 14 judges that the input state is the normal input by the steering operation according to the driver's intention.

At step S14, the command current correcting circuit 15 calculates a compensation amount according to a steering velocity (or a steering speed).

At step S15, the normal/reverse input judging circuit 14 judges that the input state is the reverse input from the steered road wheel side.

At step S16, the command current correcting circuit 15 calculates a compensation amount (in a direction that suppresses disturbance) according to the steering velocity.

At step S17, the command current correcting circuit 15 adds the correction amounts (the compensation amounts) calculated at steps S14 and S16 to the command current, then outputs it to the electric motor M.

Next, a normal/reverse input judgment criteria by the normal/reverse input judging circuit 14 will be explained with reference to FIGS. 5A to 5D.

In FIG. 5A, the input shaft side rotation angle signal S1 and the output shaft side rotation angle signal S2 change in the same direction with a difference existing between them, and also the change of the input shaft side rotation angle signal S1 is advanced with respect to that of the output shaft side rotation angle signal S2. In this case, it is judged that the input shaft is rotates by the steering of the steering wheel SW by the driver, and the output shaft 1b follows or responds to the input shaft 1a while overcoming friction. The normal/reverse input judging circuit 14 thus judges that the input state is the normal input.

In FIG. 5C, the input shaft side rotation angle signal S1 and the output shaft side rotation angle signal S2 change in the same direction with a difference existing between them, and also the change of the output shaft side rotation angle signal S2 is advanced with respect to that of the input shaft side rotation angle signal S1. In this case, it is judged that the output shaft 1b rotates by the disturbance to the steered road wheels W1 and W2, and the input shaft 1a follows or responds to the output shaft 1b. The normal/reverse input judging circuit 14 thus judges that the input state is the reverse input.

As shown in FIGS. 5A and 5C, the normal/reverse input judging circuit 14 basically judges the normal input and the reverse input on the basis of the judgment as to which change of the input shaft side rotation angle signal S1 and the output shaft side rotation angle signal S2 is advanced, in the case where the input shaft side rotation angle signal S1 and the output shaft side rotation angle signal S2 change in the same direction.

Next, the normal/reverse input judgment in a case where the input shaft side rotation angle signal S1 and the output shaft side rotation angle signal S2 do not change in the same direction will be explained.

In FIG. 5B, the input shaft side rotation angle signal S1 and the output shaft side rotation angle signal S2 change in the same direction with a certain difference existing between them. Subsequently, when the input shaft side rotation angle signal S1 changes in an opposite direction, the output shaft side rotation angle signal S2 follows or responds to the input shaft side rotation angle signal S1 then also changes in the opposite direction, and the input shaft side rotation angle signal S1 and the output shaft side rotation angle signal S2 change in the same direction while having the certain difference between them. In this case, it is judged that the driver turns the steering wheel SW in a counter direction. The normal/reverse input judging circuit 14 thus judges that the input state is the normal input by the steering operation according to the driver's intention. That is, even if the input shaft side rotation angle signal S1 temporarily changes in a direction opposite to the output shaft side rotation angle signal S2 from a state in which the normal input is judged, it is judged that the input state is the normal input by the steering operation according to the driver's intention.

In FIG. 5D, the input shaft side rotation angle signal S1 does not change, but only the output shaft side rotation angle signal S2 changes. In this case, although a turning direction of the steered road wheels W1 and W2 pulsates under an influence of the disturbance, since the driver firmly holds or grips the steering wheel SW, it is judged that the input shaft side does not rotate, and thus the normal/reverse input judging circuit 14 judges that the input state is the reverse input.

Next, the correction of the command current by the command current correcting circuit 15 will be explained in detail with reference to FIGS. 6A and 6B.

As shown in FIG. 6A, in a case where the normal/reverse input judging circuit 14 judges that the input state is the normal input and a driver's intention flag is raised, the command current correcting circuit 15 adds, so as to reduce friction of the steering mechanism, a friction compensation value, by which the command current is corrected and increased, to the command current to generate the basic steering assist force which is calculated in the command current operating circuit 11. Here, the friction compensation value is a value that compensates for total friction of the whole steering mechanism, such as mechanical friction and viscous friction of grease etc. As the friction compensation value, a value calculated by an actual measurement is used.

On the other hand, as shown in FIG. 6B, in a case where the normal/reverse input judging circuit 14 judges that the input state is the reverse input and no driver's intention flag is raised, the command current correcting circuit 15 adds a smaller friction compensation value than that of the case of the normal input judgment to the command current to generate the basic steering assist force which is calculated in the command current operating circuit 11. However, this friction compensation value could be 0 (zero). Or, as shown in FIG. 6B, it might be possible to add a friction compensation value whose direction is opposite to that of the basic steering assist force.

Next, function and effect of the electric power steering system of the embodiment 1 will be explained.

There is a case where if crosswind hits a travelling vehicle or the vehicle bumps across ruts or the steered road wheels W1 and W2 are stuck in the ruts or the vehicle travels on an uneven road surface such as gravel road, the steered road wheels W1 and W2 are turned in a different direction from the driver's intention, due to the reverse input from the road surface. Since the torsion of the torsion bar 1c occurs also by such disturbance and the torque sensor TS detects the torsion, there is a risk that the steering assist force will be provided to the steering mechanism from the electric motor M.

However, according to the electric power steering system of the present embodiment 1, as described in the following (a) to (c), it is possible to accurately or correctly judge the normal input and the reverse input even in the case of the detection of the torque sensor TS by the above disturbance, and to provide the proper steering assist force to the steering mechanism, thereby improving the steering feel and the steering stability.

(a) According to the electric power steering system of the present embodiment 1, it is judged that when the input shaft side rotation angle signal S1 and the output shaft side rotation angle signal S2 continuously change in the same direction, both rotation directions of the input shaft and the output shaft are identical by the rotation direction judging circuit 12. Thus, a sophisticated rotation direction judgment is possible, and the normal/reverse input judgment can be made more accurately.

(b) The rotation direction judging circuit 12 judges whether the both rotation directions are identical or not at the predetermined cycle period, and when the input shaft side rotation angle signal S1 and the output shaft side rotation angle signal S2 continuously change in the same direction within the predetermined cycle period, it is judged that the both rotation directions are identical. Thus, it is possible to accurately judge the rotation directions of the input shaft and the output shaft on the basis of the steering operation which has just been done by the driver and change of the reverse input from the road surface etc., and the normal/reverse input judgment can be made more accurately.

(c) Even in the case where the rotation direction judgment by the rotation direction judging circuit 12 is temporarily "not identical" because the rotation direction of the input shaft side rotation angle signal S1 is reversed (changes in the opposite direction) from the state of the normal input judgment of the normal/reverse input judging circuit 14, it is judged that the input state is the normal input when the output shaft side rotation angle signal S2 follows or responds to the input shaft side rotation angle signal S1. Thus, since the state in which the driver turns the steering wheel in the counter direction is also judged to be the normal input, it is possible to properly and correctly judge the normal input and the reverse input.

Further, when the normal/reverse input judging circuit 14 judges that the input state is the normal input, the command current correcting circuit 15 increases the command current value by the correction so as to reduce the friction of the steering mechanism. With this increase correction, driver's steering load (driver's steering effort) can be reduced.

Moreover, when the normal/reverse input judging circuit 14 judges that the input state is the reverse input, the command current correcting circuit 15 sets the friction compensation value to be smaller than that of the case of the normal input judgment (or sets the friction compensation value to 0 (zero), or sets the opposite direction friction compensation value). Therefore, the friction of the steering mechanism works against the steering assist force which does not fit to or does not meet the driver's intention upon the reverse input, and the steering feel and the steering stability can be improved.

That is, in the electric power steering system, when adding only the basic steering assist force based on the output of the torque sensor TS to the pinion shaft 2 by the electric motor M, an effort (load) equivalent to the friction of the steering mechanism has to be borne by the driver. Thus, when judging that the input state is the normal input, the value obtained by adding the friction compensation value to the basic steering assist force is provided to the pinion shaft 2 from the electric motor M, thereby lightening the steering load of the driver. Here, when judging that the input state is the reverse input, as shown in FIG. 6B, by setting the friction compensation value to be smaller than that of the case of the normal input judgment (or to 0 (zero), or setting the opposite direction friction compensation value), the friction works against the steering assist force upon the reverse input. As a consequence, the turning of the steered road wheels W1 and W2 by the steering assist force which does not meet the driver's intention is suppressed, then the steering feel and the steering stability are improved.

In addition, as described in the present embodiment 1, as the input shaft side rotation angle sensor 6 and the output shaft side rotation angle sensor 7, the torque sensor is used. Thus, other rotation angle sensors are not required, thereby reducing parts count.

Embodiment 2

An electric power steering system of an embodiment 2 of the present invention will be explained. The structure and the configuration of the electric power steering system and the ECU 4 of the embodiment 2 are basically same as those of the embodiment 1, so their explanation is omitted here. In the embodiment 2, the friction compensation value is different from that of the embodiment 1.

Figure 7:
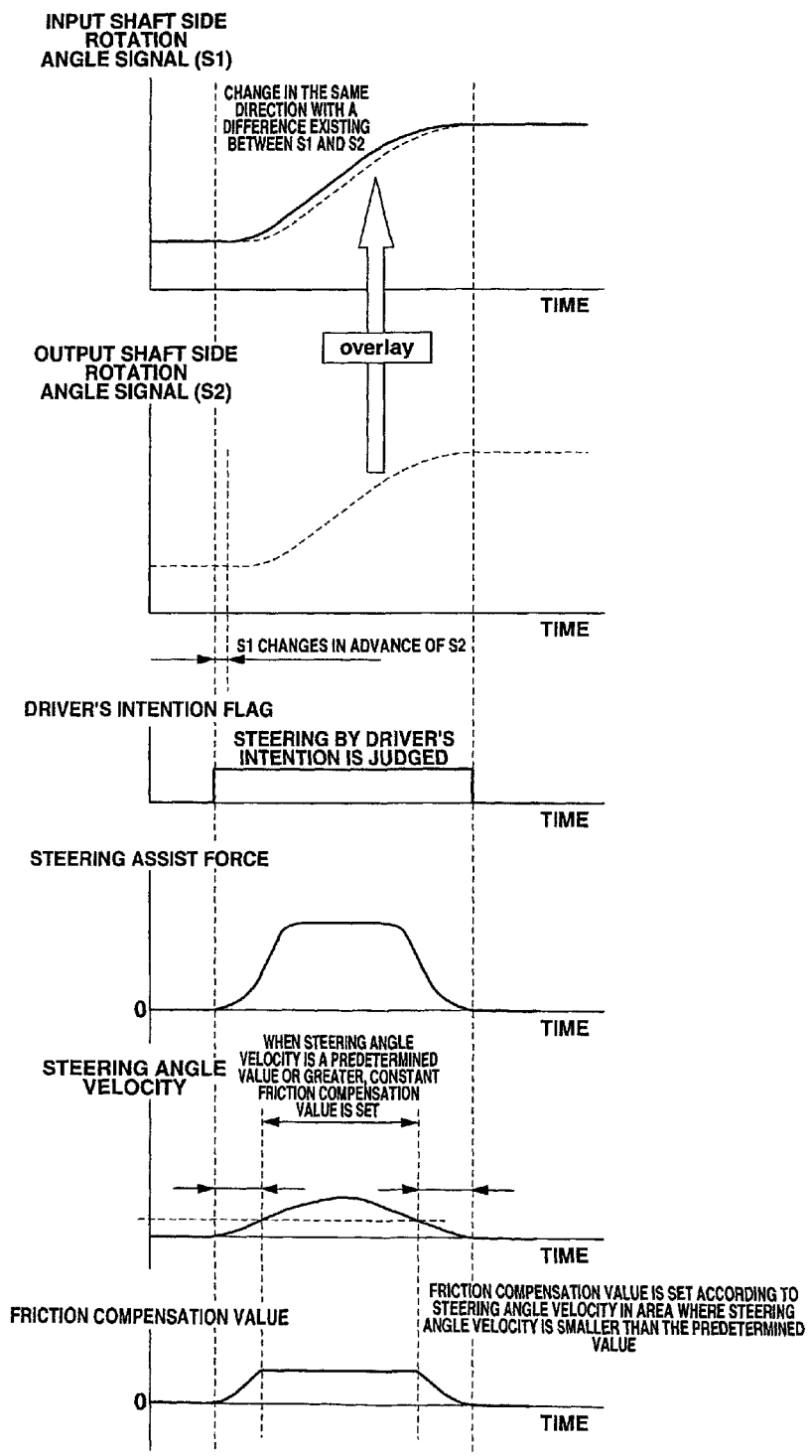
FIG. 7 is a time chart showing a friction compensation value (upon the normal input), of an embodiment 2.
Figure 8:
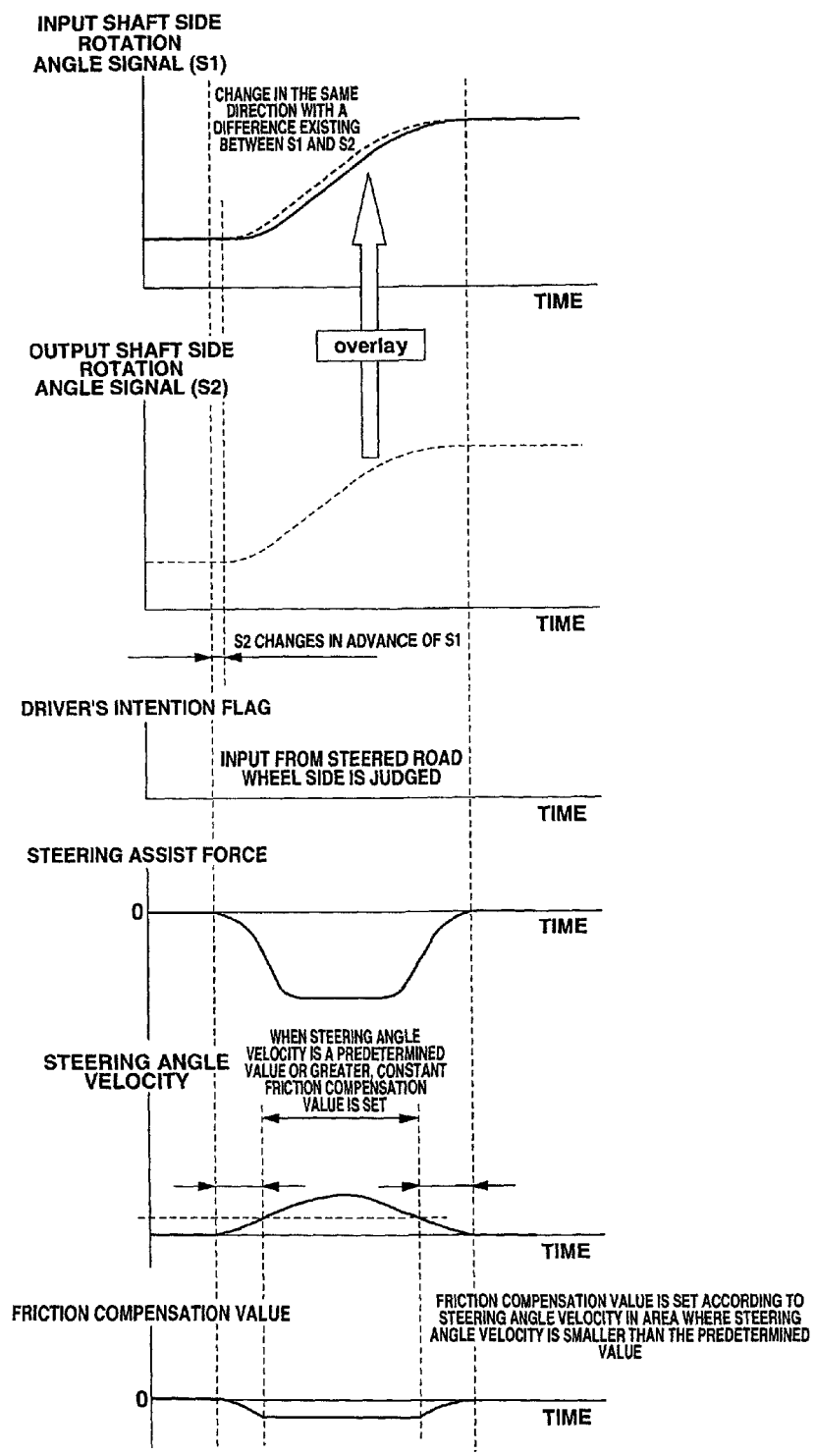
FIG. 8 is a time chart showing a friction compensation value (upon the reverse input), of the embodiment 2.

FIGS. 7 and 8 are time charts showing the friction compensation values.

FIG. 7 shows a case where the input shaft side rotation angle signal S1 and the output shaft side rotation angle signal S2 change in the same direction with a difference existing between them, and also the change of the input shaft side rotation angle signal S1 is advanced with respect to that of the output shaft side rotation angle signal S2. In this case, as same as the embodiment 1, it is judged that the steering operation according to the driver's intention is performed, and the driver's intention flag is raised, and the normal input is judged.

When a rotation speed (a steering angle speed or velocity) of the input shaft is less than or equal to a predetermined threshold value, the command current correcting circuit 15 changes the friction compensation value so that the friction compensation value increases with increase of the rotation speed of the input shaft. When the rotation speed of the input shaft is greater than the threshold value, the command current correcting circuit 15 sets the friction compensation value to a constant value, regardless of the rotation speed of the input shaft.

FIG. 8 shows a case where the input shaft side rotation angle signal S1 and the output shaft side rotation angle signal S2 change in the same direction with a difference existing between them, and also the change of the output shaft side rotation angle signal S2 is advanced with respect to that of the input shaft side rotation angle signal S1. In this case, as same as the embodiment 1, it is judged that a turning angle of the steered road wheels W1 and W2 is changed by the disturbance, and no driver's intention flag is raised, and the reverse input is judged.

Also in the case of the FIG. 8 (the reverse input), as same as the FIG. 7 (the normal input), when the rotation speed of the input shaft or the output shaft is less than or equal to a predetermined threshold value, the command current correcting circuit 15 changes the friction compensation value so that the friction compensation value increases with increase of the rotation speed of the input shaft or the output shaft. When the rotation speed of the input shaft or the output shaft is greater than the threshold value, the command current correcting circuit 15 sets the friction compensation value to a constant value, regardless of the rotation speed of the input shaft or the output shaft. Here, when judging that the input state is the reverse input, as same as the embodiment 1, the command current correcting circuit 15 sets the friction compensation value to be smaller than that of the case of the normal input judgment.

A viscous friction value such as grease that is applied to the steering mechanism changes according to a relative speed of members or components that move with respect to each other with the grease put (sandwiched) between them. An influence of the change of this viscous friction value greatly or strongly appears in an area where the relative speed of the members is low. Because of this, as described in the present embodiment 2, when the rotation speed of the input shaft or the output shaft is small (low), the friction compensation value is increased with increase of the rotation speed of the input shaft or the output shaft so as to overcome the viscous friction value. When the rotation speed of the input shaft or the output shaft is greater than the threshold value, the friction compensation value is set to the constant value, without consideration given to the viscous friction value, but with consideration given to only the mechanical friction.

With this setting, in the electric power steering system of the embodiment 2, in addition to the effects of the embodiment 1, since the friction compensation value according to the viscous friction value can be provided in the area where the influence of the change of the viscous friction value is great, it is possible to provide the proper steering assist force to the steering mechanism. Additionally, the proper steering assist force can be provided to the steering mechanism also in an area where the influence of the change of the viscous friction value is small.

Embodiment 3

An electric power steering system of an embodiment 3 of the present invention will be explained. The structure and the configuration of the electric power steering system and the ECU 4 of the embodiment 3 are basically same as those of the embodiment 1, so their explanation is omitted here. In the embodiment 3, the correction of the command current is different from the embodiment 1.

Figure 9:
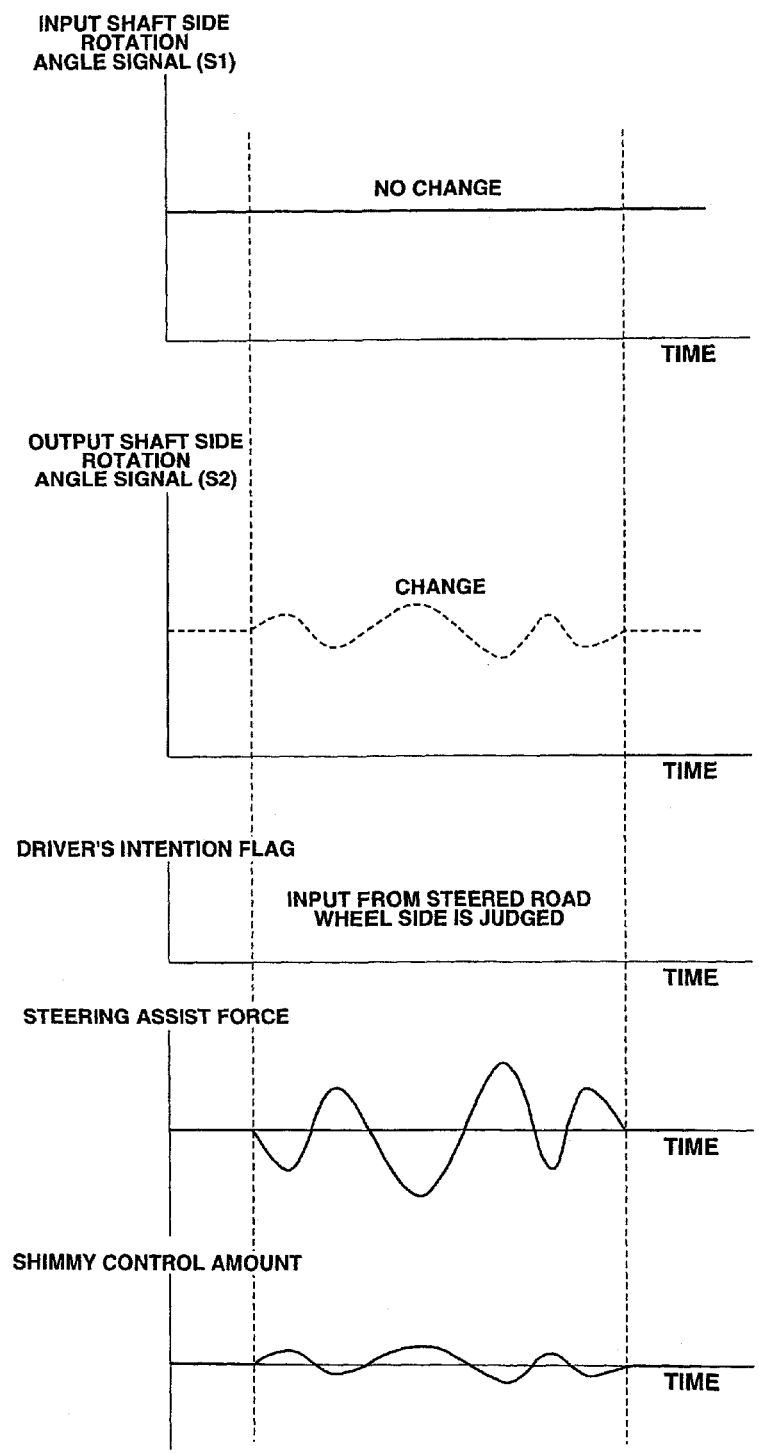
FIG. 9 is a time chart showing a shimmy control amount, of an embodiment 3.

FIG. 9 is a time chart showing the correction of the command current of the embodiment 3. As shown in FIG. 9, the input shaft side rotation angle signal S1 does not change, but the output shaft side rotation angle signal S2 pulsates. That is, although the steered road wheels W1 and W2 pulsate under the influence of the disturbance, since the driver firmly holds or grips the steering wheel SW, the input shaft 1a side does not rotate. At this time, the normal/reverse input judging circuit 14 judges that the input state is the reverse input by the disturbance, and no driver's intention flag is raised.

Even such case, since the torsion of the torsion bar 1c occurs and the torque sensor TS detects the torsion, the steering assist force would be provided to the pinion shaft 2 from the electric motor M.

Thus, in the embodiment 3, the command current correcting circuit 15 adds a shimmy control amount that cancels or counteracts (or reduces) the steering assist force to the command current to generate the basic steering assist force which is calculated in the command current operating circuit 11.

Hence, according to the electric power steering system of the embodiment 3, a steering assist force generated by the influence of the disturbance is suppressed, and there is no need for the driver to firmly holds the steering wheel SW. As a consequence, driver's steering effort (load) can be reduced, also the steering stability can be improved.

Embodiment 4

An electric power steering system of an embodiment 4 of the present invention will be explained. The structure and the configuration of the electric power steering system and the ECU 4 of the embodiment 4 are basically same as those of the embodiments 1 to 3, so their explanation is omitted here.

Figure 10A:
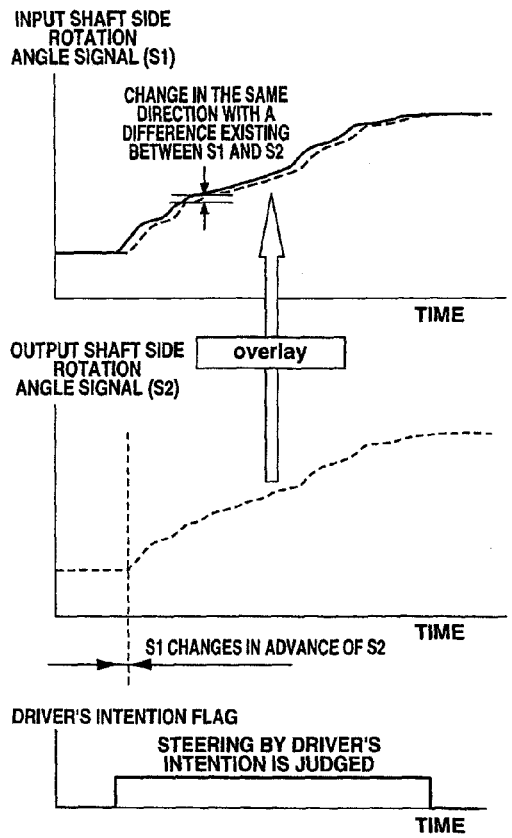
FIGS. 10A and 10B are time charts showing a steering assist force, of an embodiment 4.
Figure 10B:
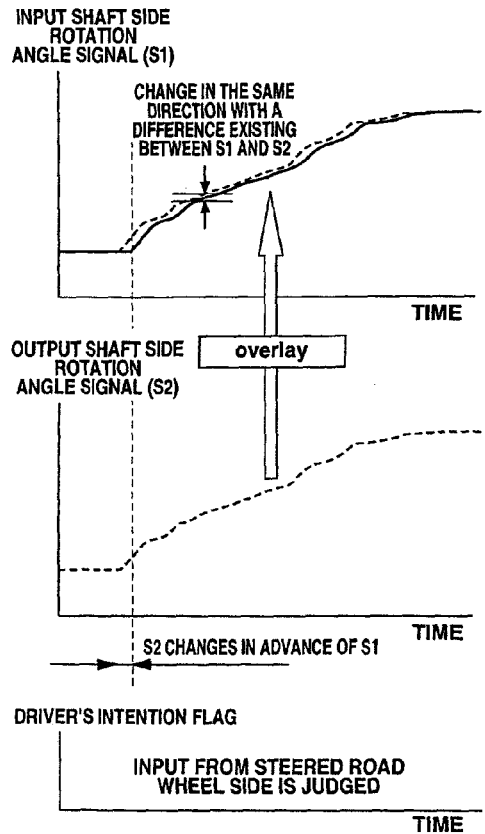

FIGS. 10A and 10B are time charts showing the steering assist force of the embodiment 4. FIG. 10A shows a case where the input shaft side rotation angle signal S1 and the output shaft side rotation angle signal S2 change in the same direction with a difference existing between them, and also the change of the input shaft side rotation angle signal S1 is advanced with respect to that of the output shaft side rotation angle signal S2. In this case, it is judged that the steering operation according to the driver's intention is performed, and the driver's intention flag is raised, and the normal/reverse input judging circuit 14 judges that the input state is the normal input. When judging that the input state is the normal input, the command current correcting circuit 15 adds the friction compensation value to the command current to generate the basic steering assist force which is calculated in the command current operating circuit 11, like the embodiments 1 and 2.

On the other hand, FIG. 10B shows a case where the input shaft side rotation angle signal S1 and the output shaft side rotation angle signal S2 change in the same direction with a difference existing between them, and also the change of the output shaft side rotation angle signal S2 is advanced with respect to that of the input shaft side rotation angle signal S1.

When the reverse input is judged by the normal/reverse input judging circuit 14, the command current correcting circuit 15 corrects the command current so as to decrease a generation torque of the electric motor M. That is, in the embodiment 4, unlike the embodiments 1 to 3 which improve the steering stability by controlling the friction compensation value added to the basic steering assist force, when the reverse input is judged, the basic steering assist force itself is set to be small, then the steering stability is improved. Additionally, when the reverse input is judged, the command current correcting circuit 15 does not add the friction compensation value.

As described above, according to the embodiment 4, when judging that the input state is the reverse input, by reducing the steering assist force, the turning of the steered road wheels W1 and W2 by the steering assist force which does not meet the driver's intention is suppressed, then the steering feel and the steering stability are improved.

Embodiment 5

An electric power steering system of an embodiment 5 of the present invention will be explained. The structure and the configuration of the electric power steering system and the ECU 4 of the embodiment 5 are basically same as those of the embodiments 1 to 4, so their explanation is omitted here.

Figure 11A:
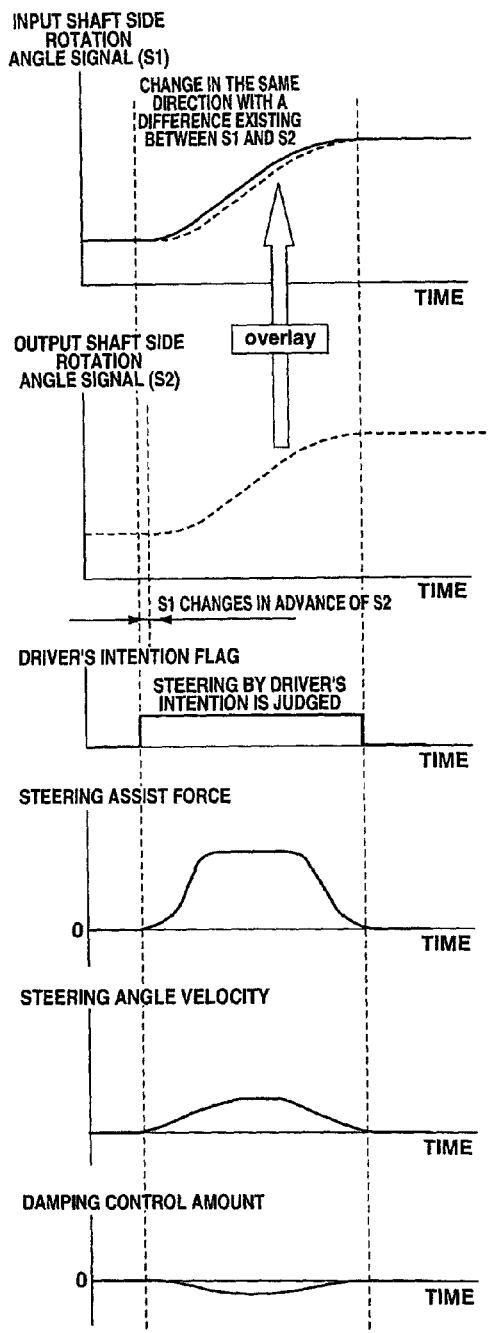
FIGS. 11A and 11B are time charts showing a damping control amount, of an embodiment 5.
Figure 11B:
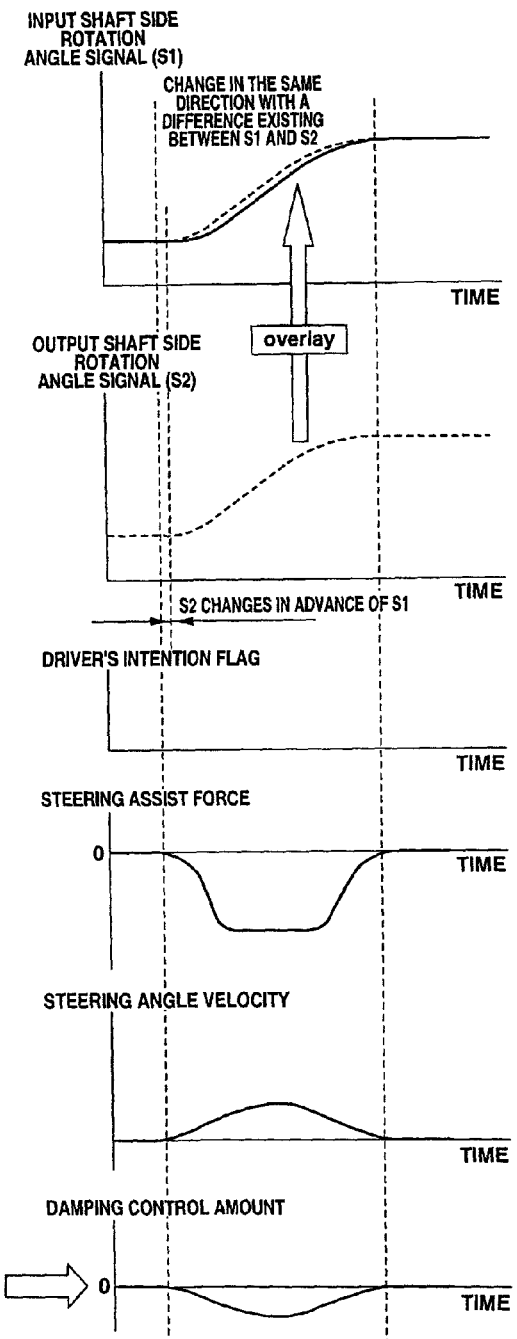

FIGS. 11A and 11B are time charts showing a damping control amount of the embodiment 5. FIG. 11A shows a case where the input shaft side rotation angle signal S1 and the output shaft side rotation angle signal S2 change in the same direction with a difference existing between them, and also the change of the input shaft side rotation angle signal S1 is advanced with respect to that of the output shaft side rotation angle signal S2. In this case, it is judged that the steering operation according to the driver's intention is performed, and the driver's intention flag is raised, and the normal/reverse input judging circuit 14 judges that the input state is the normal input.

FIG. 11B shows a case where the input shaft side rotation angle signal S1 and the output shaft side rotation angle signal S2 change in the same direction with a difference existing between them, and also the change of the output shaft side rotation angle signal S2 is advanced with respect to that of the input shaft side rotation angle signal S1. In FIG. 11B, the normal/reverse input judging circuit 14 judges that the input state is the input from the steered road wheels W1 and W2, and no driver's intention flag is raised, and the reverse input is judged.

In the embodiment 5, a correction value (hereinafter called a damping control amount) whose direction is opposite to the command current to generate the basic steering assist force which is calculated in the command current operating circuit 11, is added to the command current. This damping control amount is the one that suppresses an abrupt acceleration of the steered road wheels W1, W2, and brings about the stability.

As shown in FIGS. 11A and 11B, the damping control amount of the case of the reverse input judgment shown in FIG. 11B is set to be greater than that of the case of the normal input judgment shown in FIG. 11A. This is because when the normal input is judged as shown in FIG. 11A, the steering assist force is the one that meets the driver's intention, and the aim is only to suppress the abrupt acceleration of the steered road wheels W1, W2 and to bring about the stability.

In contrast to this, when the reverse input is judged as shown in FIG. 11B, since the steering assist force is the one that does not meet the driver's intention, by setting the damping control amount to be great, the steering assist force is suppressed while suppressing the abrupt acceleration of the steered road wheels W1, W2.

This damping control amount is calculated on the basis of a rotation speed of the electric motor M and the steering velocity of the steering wheel SW etc. The damping control amount is calculated in a different device from the operation circuit 10.

According to the embodiment 5, by performing the damping control, it is possible to suppress the abrupt acceleration of the steered road wheels W1, W2 and to bring about the stability. Further, by setting the damping control amount to be great upon the reverse input, the steering assist force that does not meet the driver's intention, which is cased by the disturbance, is suppressed, and the steering feel and the steering stability can be improved. Furthermore, it is possible to strike a balance of the steering stability between the normal input state and the reverse input state.

The electric power steering system of the present invention has been explained above on the basis of the embodiments 1 to 5. However, the electric power steering system of the present invention is not limited to the embodiments 1 to 5.

For instance, the electric power steering system of the present invention could be a column assist type steering system or a rack assist type steering system. As long as a component arrangement order from the steering wheel SW side is the torque sensor TS and the electric motor M in the steering system, the present invention can be applied to such steering system.

Further, regarding the torque sensor TS, the input shaft side and output shaft side rotation angle sensors 6, 7 and a CPU are formed integrally with each other, and this integral device could form the torque sensor TS. Then, the input shaft side rotation angle signal S1 and the output shaft side rotation angle signal S2, which are digitized by the CPU, are inputted into the ECU 4 through the harness (the clock cable, the slip ring etc.) or the radio communication.

Moreover, in the embodiment 1, although the output shaft side rotation angle sensor 7 is arranged at the output shaft 1b side of the torsion bar 1c, as the output shaft side rotation angle sensor 7, a rotation angle sensor of the electric motor M might be used. As a result, there is no need to specially provide the output shaft side rotation angle sensor, and the parts count is reduced.

The above embodiments can produce advantageous effects as described above. In addition to those, modified examples having substantially the same effects as the above embodiments will be explained below.

(1) In the electric power steering system, the normal/reverse input judging circuit (14) judges that when the rotation direction judgment by the rotation direction judging circuit (12) is "not identical" because the rotation direction of the input shaft side rotation angle signal (S1) is reversed from a state of the normal input judgment of the normal/reverse input judging circuit (14), the input state is the normal input.

According to the electric power steering system of (1), since the state in which the driver turns the steering wheel in the counter direction is also judged to be the normal input, it is possible to properly and correctly judge the normal input and the reverse input.

(2) In the electric power steering system, when the normal input is judged by the normal/reverse input judging circuit (14), the command current correcting circuit (15) performs a friction compensation control that increases the command current value so as to reduce friction of the steering mechanism.

According to the electric power steering system of (2), by correcting the command current value so as to reduce friction of the steering mechanism, the steering load of the driver is lightened and the steering feel can be improved.

(3) In the electric power steering system, when a rotation speed of the input shaft (1a) is less than or equal to a predetermined threshold value, the command current correcting circuit (15) changes a friction compensation value of the friction compensation control so that the friction compensation value increases with increase of the rotation speed of the input shaft (1a).

The viscous friction value such as grease that is applied to the steering mechanism changes according to the relative speed of members or components that move with respect to each other with the grease put (sandwiched) between them. The influence of the change of this viscous friction value greatly or strongly appears in the area where the relative speed of the members is low. Because of this, according to the electric power steering system of (3), since the friction compensation value according to the change of the viscous friction value is provided, the proper steering assist force can be provided.

(4) In the electric power steering system, when the rotation speed of the input shaft (1a) is greater than the threshold value, the command current correcting circuit (15) sets the friction compensation value to a constant value, regardless of the rotation speed of the input shaft (1a).

According to the electric power steering system of (4), the proper steering assist force can be provided to the steering mechanism also in the area where the influence of the change of the viscous friction value is small.

(5) In the electric power steering system, when the reverse input is judged by the normal/reverse input judging circuit (14), the command current correcting circuit (15) sets a friction compensation value, which is added to the command current value in a friction compensation control that reduces friction of the steering mechanism, to be smaller than that of a case where the normal input is judged by the normal/reverse input judging circuit (14), or sets the friction compensation value to 0 (zero).

According to the electric power steering system of (5), when the reverse input is judged, the steering stability is improved by the fact that the friction of the steering mechanism works against the steering assist force.

(6) In the electric power steering system, when a rotation speed of the input shaft (1a) or the output shaft (1b) is less than or equal to a predetermined threshold value, the command current correcting circuit (15) changes a friction compensation value of the friction compensation control so that the friction compensation value increases with increase of the rotation speed of the input shaft (1a) or the output shaft (1b).

According to the electric power steering system of (6), since the friction compensation value according to the change of the viscous friction value is provided, the proper steering assist force can be provided.

(7) In the electric power steering system, when the rotation speed of the input shaft (1a) or the output shaft (1b) is greater than the threshold value, the command current correcting circuit (15) sets the friction compensation value to a constant value, regardless of the rotation speed of the input shaft (1a) or the output shaft (1b).

According to the electric power steering system of (7), the proper steering assist force can be provided to the steering mechanism also in the area where the influence of the change of the viscous friction value is small.

(8) In the electric power steering system, when the reverse input is judged by the normal/reverse input judging circuit (14), the command current correcting circuit (15) corrects the command current value so as to decrease the generation torque of the electric motor (M).

According to the electric power steering system of (8), by decreasing the generation torque of the electric motor M, the steering stability can be improved.

(9) In the electric power steering system, when the reverse input is judged by the normal/reverse input judging circuit (14), the command current correcting circuit (15) adds a correction value (damping control amount), whose direction is opposite to the command current value that generates a basic steering assist force, to the command current value.

According to the electric power steering system of (9), when the reverse input is judged, by performing the damping control, the steering assist force that does not meet the driver's intention, which is cased by the disturbance, is suppressed and the steering stability can be improved.

(10) In the electric power steering system, when the reverse input is judged by the normal/reverse input judging circuit (14), the command current correcting circuit (15) sets the opposite direction correction value (damping control amount) added to the command current value generating the basic steering assist force to be greater than that of a case where the normal input is judged by the normal/reverse input judging circuit (14).

According to the electric power steering system of (10), when the normal input is judged, the abrupt acceleration of the steered road wheels W1, W2 is suppressed. When the reverse input is judged, the steering assist force that does not meet the driver's intention, which is cased by the disturbance, is suppressed while suppressing the abrupt acceleration of the steered road wheels W1, W2. it is therefore possible to strike a balance of the steering stability between the normal input state and the reverse input state.

(11) In the electric power steering system, the output shaft side rotation angle sensor (7) is a rotation angle sensor that detects a rotation angle of an output shaft of the electric motor (M).

According to the electric power steering system of (11), there is no need to specially provide the output shaft side rotation angle sensor, and the parts count is reduced.

(12) In the electric power steering system, the input shaft side rotation angle sensor (6) and the output shaft side rotation angle sensor (7) are a torque sensor (TS) that detects a steering torque generated at the torsion bar (1c) on the basis of an angle difference between the input shaft side rotation angle signal (S1) and the output shaft side rotation angle signal (S2).

According to the electric power steering system of (12), since the torque sensor TS is used as the input shaft side rotation angle sensor 6 and the output shaft side rotation angle sensor 7, other rotation angle sensors are not required, thereby reducing parts count.

(13) In the controller of the electric power steering system, the rotation direction judging circuit (12) judges that when the input shaft side rotation angle signal (S1) continuously changes in a same direction and also the output shaft side rotation angle signal (S2) continuously changes in the same rotation direction as the input shaft side rotation angle signal (S1), both rotation directions of the input and output shafts (1a, 1b) are identical.

According to the electric power steering system of (13), the state in which the steering operation from the input shaft side is transmitted to the output shaft side is judged to be the normal input, thereby accurately judging the normal/reverse input.

(14) In the controller of the electric power steering system, the rotation direction judging circuit (12) judges that when the input shaft side rotation angle signal (S1) continuously changes in the same direction and also the output shaft side rotation angle signal (S2) continuously changes in the same rotation direction as the input shaft side rotation angle signal (S1) within a predetermined cycle period, both rotation directions of the input and output shafts are identical.

According to the electric power steering system of (14), the steering operation which has just been done by the driver and change of the reverse input from the road surface etc. can be accurately judged.

(15) In the controller of the electric power steering system, the normal/reverse input judging circuit (14) judges that when the rotation direction judgment by the rotation direction judging circuit (12) is "not identical" because the rotation direction of the input shaft side rotation angle signal (S1) is reversed from a state of the normal input judgment of the normal/reverse input judging circuit (14), the input state is the normal input.

According to the electric power steering system of (15), since the state in which the driver turns the steering wheel in the counter direction is also judged to be the normal input, it is possible to properly and correctly judge the normal input and the reverse input.

(16) In the controller of the electric power steering system, when the normal input is judged by the normal/reverse input judging circuit (14), the command current correcting circuit (15) performs a friction compensation control that increases the command current value so as to reduce friction of a steering mechanism.

According to the electric power steering system of (16), by correcting the command current value so as to reduce friction of the steering mechanism, the steering load of the driver is lightened and the steering feel can be improved.

The entire contents of Japanese Patent Application No. 2012-052526 filed on Mar. 9, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electric power steering system comprising:
a steering mechanism having
(a) an input shaft which rotates according to a steering operation of a steering wheel;
(b) an output shaft which is connected to the input shaft through a torsion bar, and to which the rotation of the input shaft is transmitted; and
(c) a conversion mechanism which converts a rotation of the output shaft to a steering motion of steered road wheels;
an input shaft side rotation angle sensor provided at an input shaft side and detecting a rotation angle of the input shaft;
an output shaft side rotation angle sensor provided at an output shaft side and detecting or estimating a rotation angle of the output shaft;
an electric motor providing a steering assist force to the steering mechanism;
an operation circuit calculating, on the basis of a vehicle driving condition, a command current value that is sent to the electric motor;
a rotation direction judging circuit provided in the operation circuit and judging whether or not a rotation direction of the input shaft and a rotation direction of the output shaft are identical;
an advanced-phase judging circuit provided in the operation circuit and judging which phase of an input shaft side rotation angle signal that is an output signal of the input shaft side rotation angle sensor and an output shaft side rotation angle signal that is an output signal of the output shaft side rotation angle sensor is advanced;
a normal/reverse input judging circuit provided in the operation circuit and judging that
(i) when the rotation direction judging circuit judges that both rotation directions are identical and also the advanced-phase judging circuit judges that the phase of the input shaft side rotation angle signal is advanced, an input state is a normal input by which torsion of the torsion bar occurs by an input from the input shaft side, and
(ii) when the rotation direction judging circuit judges that both rotation directions are identical and also the advanced-phase judging circuit judges that the phase of the output shaft side rotation angle signal is advanced, the input state is a reverse input by which the torsion of the torsion bar occurs by an input from the output shaft side; and
a command current correcting circuit provided in the operation circuit and correcting the command current value for the electric motor so that when the normal input is judged by the normal/reverse input judging circuit, a generation torque in the same direction as the rotation direction of the input shaft by the electric motor is greater than that of a case where the reverse input is judged by the normal/reverse input judging circuit.

2. The electric power steering system as claimed in claim 1, wherein:
the rotation direction judging circuit judges that when the input shaft side rotation angle signal continuously changes in a same direction and also the output shaft side rotation angle signal continuously changes in the same rotation direction as the input shaft side rotation angle signal, both rotation directions of the input and output shafts are identical.

3. The electric power steering system as claimed in claim 2, wherein:
the rotation direction judging circuit judges that when the input shaft side rotation angle signal continuously changes in the same direction and also the output shaft side rotation angle signal continuously changes in the same rotation direction as the input shaft side rotation angle signal within a predetermined cycle period, both rotation directions of the input and output shafts are identical.

4. The electric power steering system as claimed in claim 3, wherein:
the normal/reverse input judging circuit judges that when the rotation direction judgment by the rotation direction judging circuit is "not identical" because the rotation direction of the input shaft side rotation angle signal is reversed from a state of the normal input judgment of the normal/reverse input judging circuit, the input state is the normal input.

5. The electric power steering system as claimed in claim 1, wherein:
when the normal input is judged by the normal/reverse input judging circuit, the command current correcting circuit performs a friction compensation control that increases the command current value so as to reduce friction of the steering mechanism.

6. The electric power steering system as claimed in claim 5, wherein:
when a rotation speed of the input shaft is less than or equal to a predetermined threshold value, the command current correcting circuit changes a friction compensation value of the friction compensation control so that the friction compensation value increases with increase of the rotation speed of the input shaft.

7. The electric power steering system as claimed in claim 6, wherein:
when the rotation speed of the input shaft is greater than the threshold value, the command current correcting circuit sets the friction compensation value to a constant value, regardless of the rotation speed of the input shaft.

8. The electric power steering system as claimed in claim 1, wherein:
when the reverse input is judged by the normal/reverse input judging circuit, the command current correcting circuit sets a friction compensation value, which is added to the command current value in a friction compensation control that reduces friction of the steering mechanism, to be smaller than that of a case where the normal input is judged by the normal/reverse input judging circuit, or sets the friction compensation value to 0 (zero).

9. The electric power steering system as claimed in claim 8, wherein:
when a rotation speed of the input shaft or the output shaft is less than or equal to a predetermined threshold value, the command current correcting circuit changes a friction compensation value of the friction compensation control so that the friction compensation value increases with increase of the rotation speed of the input shaft or the output shaft.

10. The electric power steering system as claimed in claim 9, wherein:
when the rotation speed of the input shaft or the output shaft is greater than the threshold value, the command current correcting circuit sets the friction compensation value to a constant value, regardless of the rotation speed of the input shaft or the output shaft.

11. The electric power steering system as claimed in claim 1, wherein:
when the reverse input is judged by the normal/reverse input judging circuit, the command current correcting circuit corrects the command current value so as to decrease the generation torque of the electric motor.

12. The electric power steering system as claimed in claim 1, wherein:
when the reverse input is judged by the normal/reverse input judging circuit, the command current correcting circuit adds a correction value, whose direction is opposite to the command current value that generates a basic steering assist force, to the command current value.

13. The electric power steering system as claimed in claim 12, wherein:
when the reverse input is judged by the normal/reverse input judging circuit, the command current correcting circuit sets the opposite direction correction value added to the command current value generating the basic steering assist force to be greater than that of a case where the normal input is judged by the normal/reverse input judging circuit.

14. The electric power steering system as claimed in claim 1, wherein:
the output shaft side rotation angle sensor is a rotation angle sensor that detects a rotation angle of an output shaft of the electric motor.

15. The electric power steering system as claimed in claim 1, wherein:
the input shaft side rotation angle sensor and the output shaft side rotation angle sensor are a torque sensor that detects a steering torque generated at the torsion bar on the basis of an angle difference between the input shaft side rotation angle signal and the output shaft side rotation angle signal.

16. A controller of an electric power steering system that provides a steering assist force to steered road wheels by an electric motor according to a steering operation of a steering wheel, the controller comprising:
an operation circuit calculating, on the basis of a vehicle driving condition, a command current value that is sent to the electric motor;
a rotation angle receiving section provided in the operation circuit and receiving an input shaft side rotation angle signal that is a signal regarding a rotation angle of an input shaft which rotates according to the steering operation of the steering wheel and an output shaft side rotation angle signal that is a signal regarding a rotation angle of an output shaft which is connected to the input shaft through a torsion bar and to which the rotation of the input shaft is transmitted;
a rotation direction judging circuit provided in the operation circuit and judging whether or not a rotation direction of the input shaft and a rotation direction of the output shaft are identical on the basis of the input shaft side rotation angle signal and the output shaft side rotation angle signal;
an advanced-phase judging circuit provided in the operation circuit and judging which phase of the input shaft side rotation angle signal and the output shaft side rotation angle signal is advanced;
a normal/reverse input judging circuit provided in the operation circuit and judging that (i) when the rotation direction judging circuit judges that both rotation directions are identical and also the advanced-phase judging circuit judges that the phase of the input shaft side rotation angle signal is advanced, an input state is a normal input by which torsion of the torsion bar occurs by an input from the input shaft side, and (ii) when the rotation direction judging circuit judges that both rotation directions are identical and also the advanced-phase judging circuit judges that the phase of the output shaft side rotation angle signal is advanced, the input state is a reverse input by which the torsion of the torsion bar occurs by an input from the output shaft side; and a command current correcting circuit provided in the operation circuit and correcting the command current value for the electric motor so that when the normal input is judged by the normal/reverse input judging circuit, a generation torque in the same direction as the rotation direction of the input shaft by the electric motor is greater than that of a case where the reverse input is judged by the normal/reverse input judging circuit.

17. The controller of the electric power steering system as claimed in claim 16, wherein:

the rotation direction judging circuit judges that when the input shaft side rotation angle signal continuously changes in a same direction and also the output shaft side rotation angle signal continuously changes in the same rotation direction as the input shaft side rotation angle signal, both rotation directions of the input and output shafts are identical.

18. The controller of the electric power steering system as claimed in claim 17, wherein:

the rotation direction judging circuit judges that when the input shaft side rotation angle signal continuously changes in the same direction and also the output shaft side rotation angle signal continuously changes in the same rotation direction as the input shaft side rotation angle signal within a predetermined cycle period, both rotation directions of the input and output shafts are identical.

19. The controller of the electric power steering system as claimed in claim 18, wherein:

the normal/reverse input judging circuit judges that when the rotation direction judgment by the rotation direction judging circuit is "not identical" because the rotation direction of the input shaft side rotation angle signal is reversed from a state of the normal input judgment of the normal/reverse input judging circuit, the input state is the normal input.

20. The controller of the electric power steering system as claimed in claim 16, wherein:

when the normal input is judged by the normal/reverse input judging circuit, the command current correcting circuit performs a friction compensation control that increases the command current value so as to reduce friction of a steering mechanism.

\* \* \* \* \*